(12) United States Patent
Gill et al.

(10) Patent No.: US 6,172,791 B1
(45) Date of Patent: Jan. 9, 2001

(54) ELECTRO-OPTIC MODULATORS

(75) Inventors: Douglas M. Gill, Hoboken; Dale Conrad Jacobson, Allamuchy; Raymond Wolfe, New Providence, all of NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/325,870

(22) Filed: Jun. 4, 1999

(51) Int. Cl.⁷ ........................................................ G02F 1/03

(52) U.S. Cl. .............................. 359/249; 359/245; 385/3

(58) Field of Search ..................................... 359/237, 245, 359/249, 315, 320, 322; 385/2, 3

(56) References Cited

U.S. PATENT DOCUMENTS

| 5,091,980 | * | 2/1992 | Ogawa et al. | 385/3 |
| 5,347,601 | * | 9/1994 | Ade et al. | 385/3 |
| 5,561,549 | * | 10/1996 | Hatori et al. | 359/249 |
| 5,781,327 | * | 7/1998 | Brock et al. | 359/249 |

* cited by examiner

*Primary Examiner*—Huy Mai
(74) *Attorney, Agent, or Firm*—Thomas, Kayden, Horstemeyer & Risley LLP

(57) ABSTRACT

The specification describes a Mach-Zehnder electro-optic modulator device in which the ridge containing the waveguides in the interactive electro-optic regions have re-entrant sidewalls. This shifts the peak in the RF field profile to below the surface of the ridge and closer to the peak of the optical field, thereby producing a device with reduced drive voltage.

20 Claims, 15 Drawing Sheets

ELECTRO-OPTIC MODULATORS

FIELD OF THE INVENTION

This invention relates to electro-optic modulators and to methods for their manufacture.

BACKGROUND OF THE INVENTION

Electro-optic modulators, typically lithium niobate modulators, are essential components of most lightwave systems. In state of the art commercial systems, these devices are digital and operate with data transmission rates up to 10 Gbits. Systems under development are expected to reach data rates of 40 Gbits or more. However, as bit rates increase, drive voltages increase as well. Excessive drive voltages currently limit practical implementation of ultra high bit rate modulators. New device designs, with reduced drive voltages, are critical to the development and large-scale commercial application of these modulators.

Among proposals for achieving lower drive voltages in Mach-Zehnder electro-optic modulators is the optimization of the region of interaction between the optic and electric fields. A technique that has had limited success is the etching of ridges into the lithium niobate crystal so the waveguide is located in a rdige of electro-optic material. This improves the field penetration and allows the drive voltage to be reduced. This structure also reduces the RF line capacitance in the interaction region. However, the profiles of the optical and electric fields in this device structure remain quite different, which prevents optimal interaction over the available interaction region.

STATEMENT OF THE INVENTION

We have designed a lithium niobate electro-optic modulator in which the profile of the electric field more closely matches the profile of the optic field where the two fields are at maximum. This result is achieved by shaping the geometry of the ridge in a ridge modulator structure which in turn shapes the electric field profile. Shaping essentially involves producing a ridge for the waveguide with a re-entrant sidewall. Using this expedient, the maximum in the electric field profile can be made to occur below the surface of the ridge, at a position closer to the maximum of the optic field. By matching the maxima in the profiles, the RF/optic overlap in the device can be enhanced substantially, thereby reducing the necessary drive voltage.

DETAILED DESCRIPTION

Figure 1:
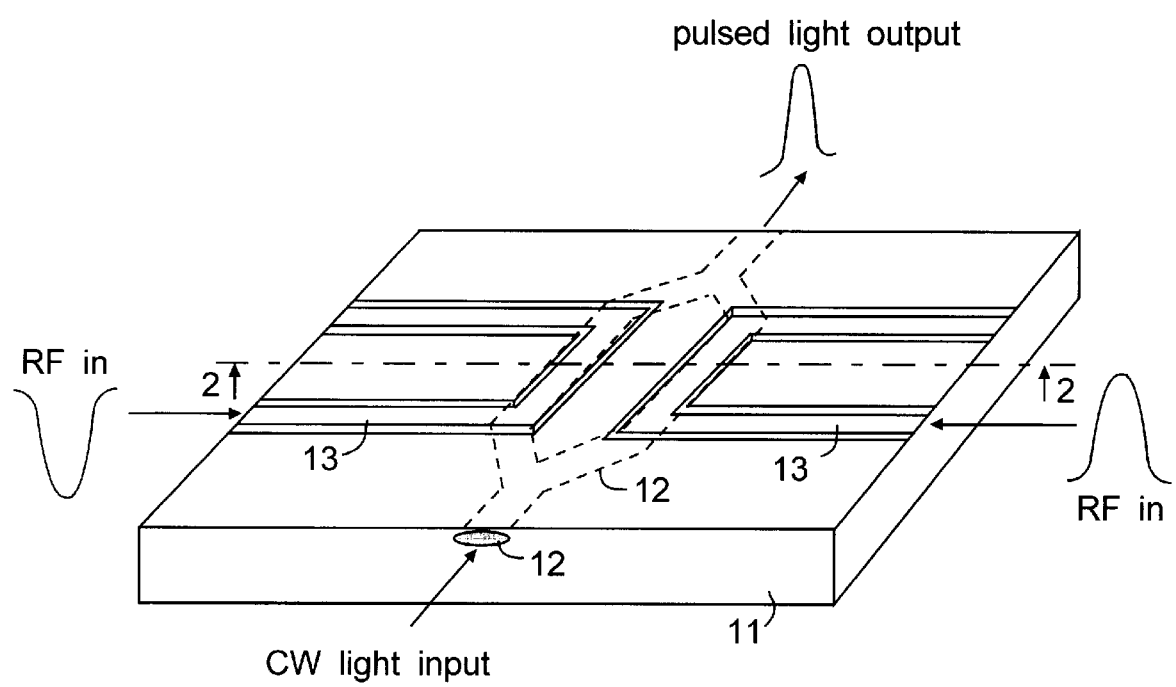
FIG. 1 is a schematic representation of a lithium niobate modulator showing a typical surface geometry.

Referring to FIG. 1, an electro-optic substrate 11 is shown with a diffused waveguide 12 formed in the substrate. The electro-optic substrate is preferably lithium niobate due to the highly developed technology existing for this material. However, other electro-optic materials can be substituted. The waveguide 12 may be formed by titanium diffusion, preferably using the known double diffusion process. The details of the formation of the waveguide are omitted here for simplicity. Techniques for forming suitable waveguides in lithium niobate and other materials are well known in the art. The waveguide 12 of FIG. 1 is split to form two active interaction regions as shown. The strip electrodes 13 overlie the interactive electro-optic regions. By impressing opposite phased voltages in the two striplines as schematically represented by the RF inputs in FIG. 1, the continuous wave optic input in each of the two arms of the Mach-Zehnder can be made to be phase matched or unmatched when the two arms are recombined. The split optical signal, when recombined, is either enhanced or extinguished resulting in a pulsed optical output with a frequency determined by the RF input signals. Mach-Zehnder electro-optic modulators are well known in the art. For more details, see Ivan P. Kaminlow and Thomas L. Koch, Optical Fiber Telecommunications IIIB, San Diego, Calif.: Academic Press, 1997, ch. 9, which, for those details, is incorporated herein by reference.

Figure 2:
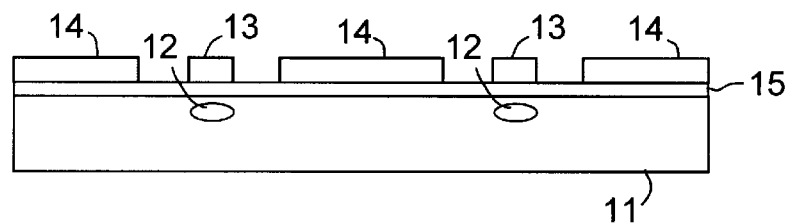
FIG. 2 is a section view showing the RF drive electrodes and the buried optical waveguide for a typical surface modulator design of the prior art.

A cross section of the active regions of the device of FIG. 1, i.e. the regions where the electric and optic fields overlap, is shown in more detail in FIG. 2, which is a section view along 2—2 of FIG. 1. Here the sub-surface waveguides 12 are shown within the lithium niobate crystal 11. The drive electrodes are shown at 13 and 14. A silicon dioxide barrier layer is shown at 15. Typical dimensions for the drive electrodes are:

thickness: 5–20 $\mu$m width of stripline: 5–20 $\mu$m thickness of barrier layer: 0.5–2.0 $\mu$m The distance separating the waveguides is controlled by the desire to minimize the waveguide angles, and keep the overall footprint small. The material of the drive electrodes is preferably gold, although other materials may also be used. The buffer layer 15 is conveniently $SiO_2$.

Figure 3:
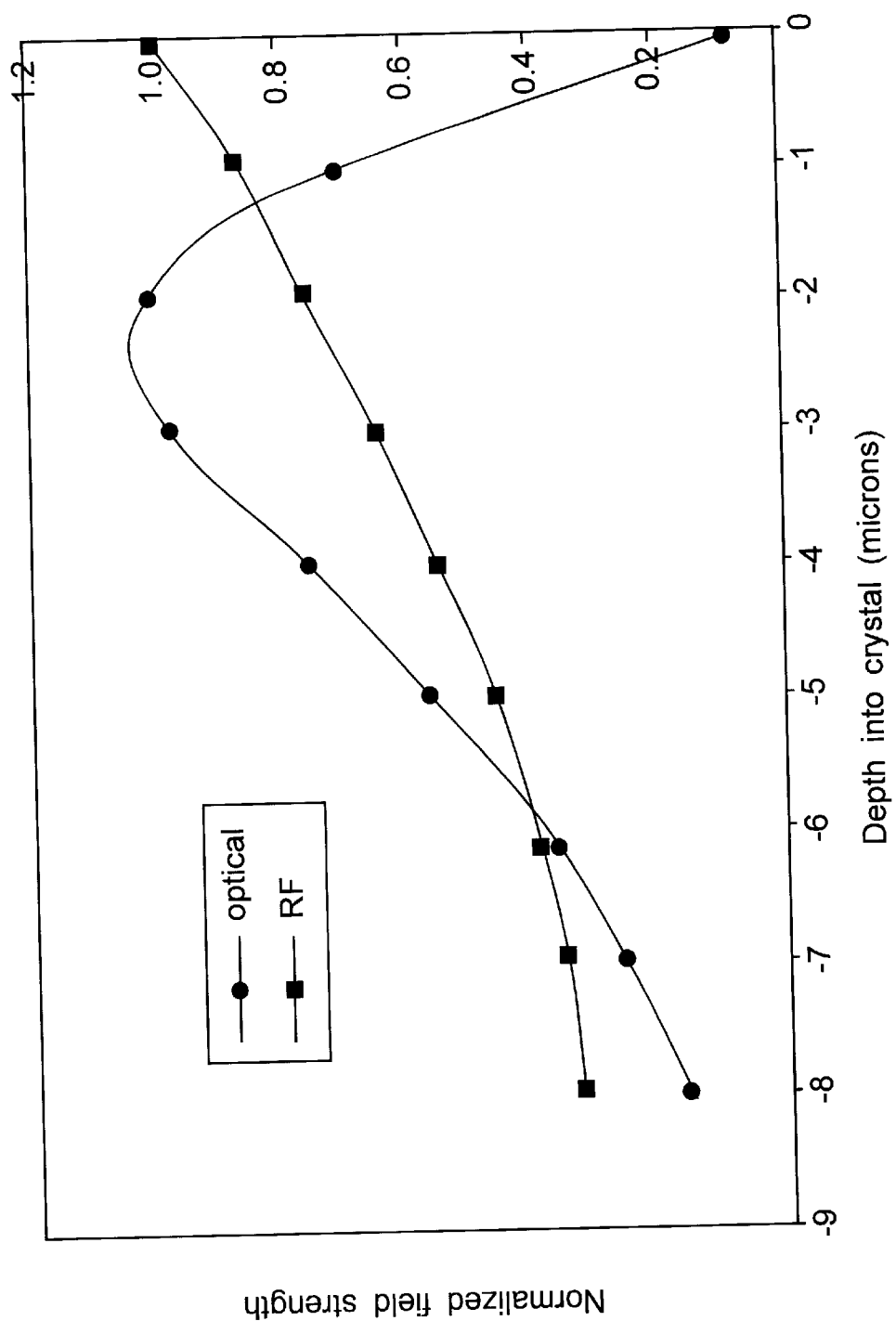
FIG. 3 is a plot of field strength vs. distance (z-direction) showing the variation in RF and optic field strength in the active region of the lithium niobate modulator of FIG. 2.

Typical RF and optic field profiles for a Mach-Zehnder modulator of the design shown in FIG. 2 is shown in FIG. 3, which is a plot of field strength vs. distance (z-direction) showing the variation in RF and optic field strength and the overlap between in the active region of the modulator. Data points for the RF field curve are shown as squares and data points for the optic field profile are shown as circles. It is evident that the RF field peaks at the surface, as expected, while the peak for the optic field of the buried waveguide is 2–3 microns below the surface.

The effectiveness of the electro-optic interaction can be improved if the peak in the RF profile more closely matches the peak in the optic profile.

Figure 4:
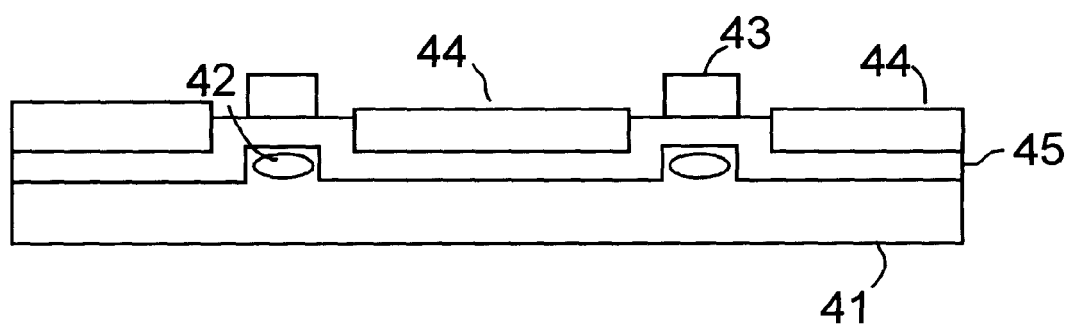
FIG. 4 is a section view similar to that of FIG. 2 showing a ridge modulator design of the prior art.

One approach for moving the RF peak closer to the optic peak is to form the waveguides with a ridge or mesa configuration thereby providing improved RF/optical field overlap. Such a device configuration is shown in FIG. 4. Here the lithium niobate substrate 41 is patterned to produce mesas with waveguides 42 buried in the mesas as shown. It will be recognized by those skilled in the art that the figures are not drawn to scale. The oxide buffer layer 45 in FIG. 4 is actually a thin deposited layer. In preferred structures the waveguide is located wholly or at least partially within the ridge.

Figure 5:
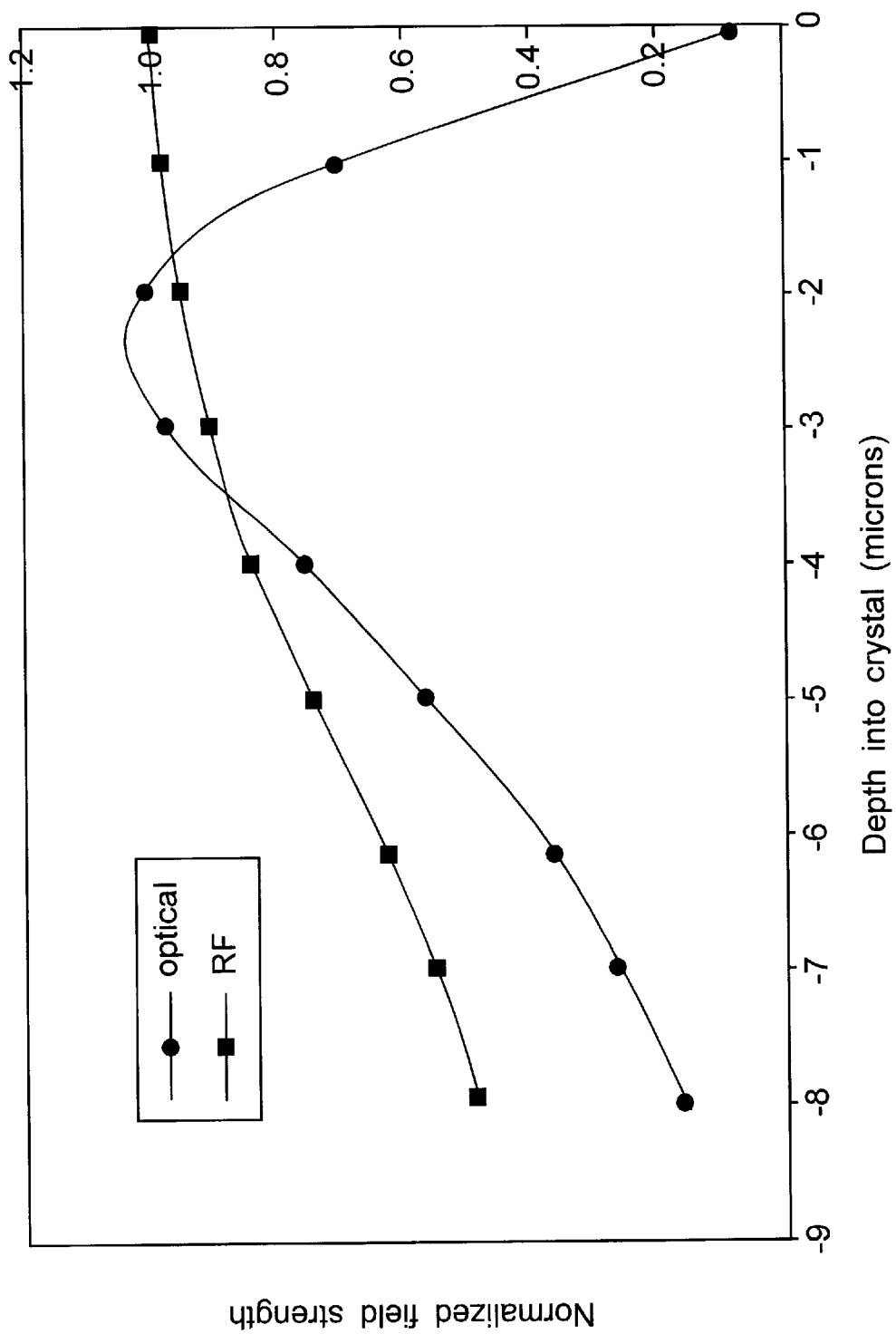
FIG. 5 is a plot of field strength vs. distance (z-direction) showing the variation in RF and optic field strength in the active region of the lithium niobate modulator of FIG. 4.

The structure of FIG. 4 is relatively easy to fabricate by simply masking the waveguide regions and etching the surface of the lithium niobate substrate. The field profile for this device is shown in FIG. 5 and shows improved overlap between the RF and optical fields. However, the maxima of the two profiles are still separated in nearly the same way as with the device of FIGS. 2 and 3.

According to the invention, the peak in the RF field profile is shifted to below the nominal surface of the lithium niobate substrate. This is achieved with a structure represented by FIG. 6. The important and novel feature in this device structure is the formation of re-entrant sidewalls 55 on the mesas containing the waveguides 52. In this structure the peak in the RF field created by electrodes 53 and 54 is shifted closer to the peak in the optical profile thus optimizing the overlap and improving the effectiveness of the electro-optic interaction.

The mechanism through which this new result is described as follows.

As outlined briefly above, the RF/optical field overlap can be improved, without degrading the capability for achieving a velocity matched device design, by altering the RF field distribution such that the peak in the RF field strength coincides with the peak in the optical field strength. One way to achieve this is to alter the radio-frequency relative permittivity of the crystal such that the relative dielectric constant of the optical waveguide has a minimal value at the point where the maximum RF field strength is desired. In this way a larger RF field can be produced in the region of the optical waveguide. This can be more clearly illustrated by analogy. Consider a parallel plate capacitor with two dielectric materials, "a" and "b" within the capacitor gap, with material "a" having a significantly smaller relative dielectric constant than material "b". Further, the two materials are arranged within the capacitor gap in a sandwich configuration so that material "a" is confined to the very center of the gap region, and material "b" fills the rest of the gap on either side of material "a". The field distribution will be such that there will be a much larger field in the low dielectric material, material "a". Stated another way, most of the voltage drop between the two capacitor plates will occur in the low dielectric material. This analogy can be applied to the optical modulator shown in FIG. 6. If the dielectric constant of the modulator is reduced only in the optical waveguide region, a larger RF field, and therefore a larger RF/optical overlap, will be achieved in the device.

However, techniques for altering the dielectric constant of lithium niobate while maintaining large electro-optic coefficients in the modified region of the crystal have not been developed. We propose therefore to modify the "effective" dielectric constant of the waveguide by changing the geometry of the waveguide ridge, without changing the material properties of the lithium niobate crystal itself.

Figure 6:
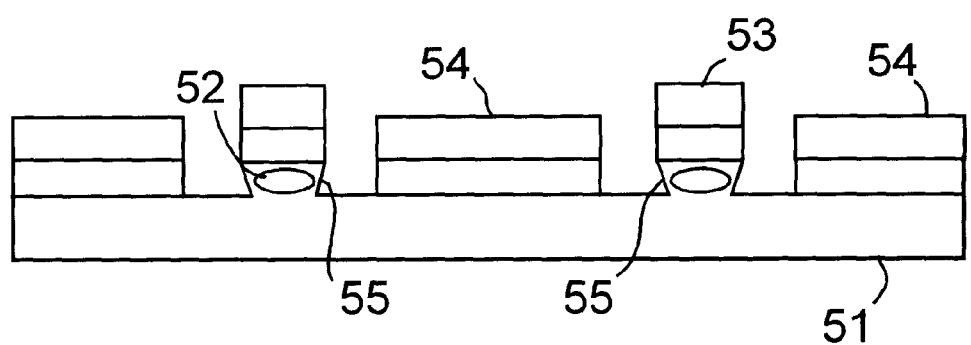
FIG. 6 is a section view similar to that of FIGS. 2 and 4 showing a modified ridge modulator design according to the invention.

The effective dielectric constant of the ridge is dependent on the width of the ridge. By reducing the width of the ridge at the base of the ridge, with respect to the top of the ridge, e.g. by undercutting the ridge, as shown in FIG. 6, the effective dielectric constant has a minimum at a point below the surface of the ridge. In this optical waveguide the RF field has a maximum near the center of the optical mode in the waveguide. When the effective dielectric constant of the waveguide is at a minimum where the optical field is at a maximum, the shape of the RF and optical field profiles are more closely matched.

In the device structure shown in FIG. 6 the electrodes 54 are shown offset, i.e. recessed, in the z-direction due to the ridge structure. Devices with essentially equivalent performance, due to the re-entrant sidewall effect of the invention, can be produced with coplanar electrodes. As will be evident from the description below, structures with coplanar electrodes may be easier to process and package. It may be more apt to describe structures with coplanar electrodes as having waveguides bounded by "trenches", rather than as waveguides contained in "ridges". The relevant re-entrant sidewalls in such a case are the trench sidewalls. In much of the description herein these two cases are appropriately regarded as equivalent.

Figure 7:
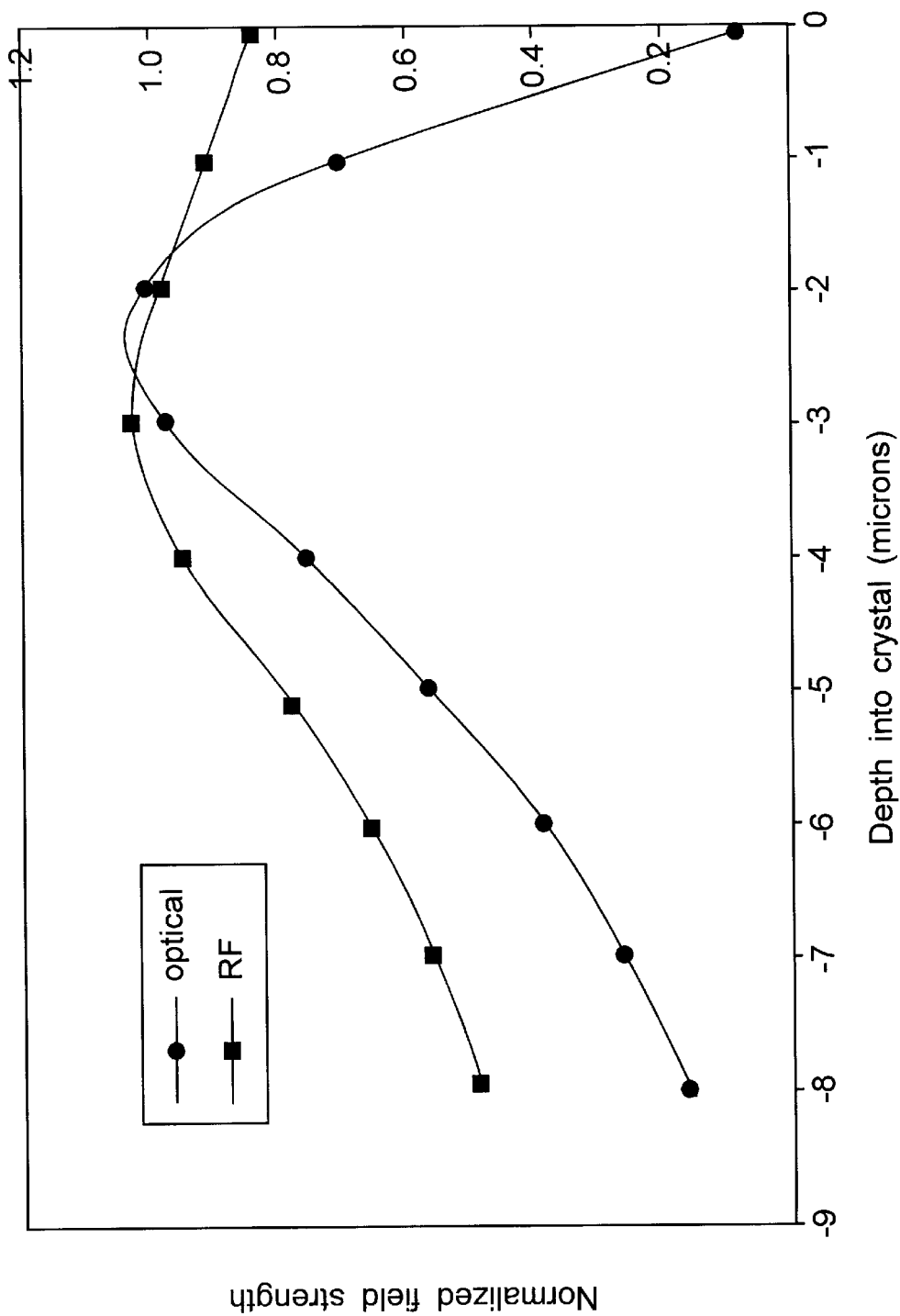
FIG. 7 is a plot of field strength vs. distance (z-direction) showing the variation in RF and optic field strength in the active region of the lithium niobate modulator of FIG. 6.

The RF and optical field profiles for the device of FIG. 6 are shown in FIG. 7. Here it is evident that the maximum in the RF field profile has been shifted to below the surface of the ridge to a point that is approximately the peak in the optical field profile.

The important feature of the device of FIG. 6 is the negative slope on the sidewall of the ridge. For purpose of definition, this structure is referred to herein as a re-entrant sidewall, i.e. a sidewall that is directed inwardly. In a typical device with a ridge waveguide, the sidewall of the ridge will be sloped outwardly, or, if an ideal anisotropic etch is used, will be vertical. Specific and atypical process steps, which will be described below, are used to obtain a re-entrant sidewall. It is recommended that the re-entrant angle, i.e. the angle the sidewall makes with a vertical, is at least $-5°$, and preferably at least $-10°$, with more negative numbers meeting the prescribed conditions.

In the preferred case the sidewalls are sloped uniformly. However, non-uniform slopes are also effective as long as the average width of the electrode gap at the bottom of the ridge is greater than the average width at the top of the ridge. This condition is met with continuous slopes or with stepped slopes. In either case the sidewall is considered re-entrant, i.e. essentially slopes inward.

Figure 8:
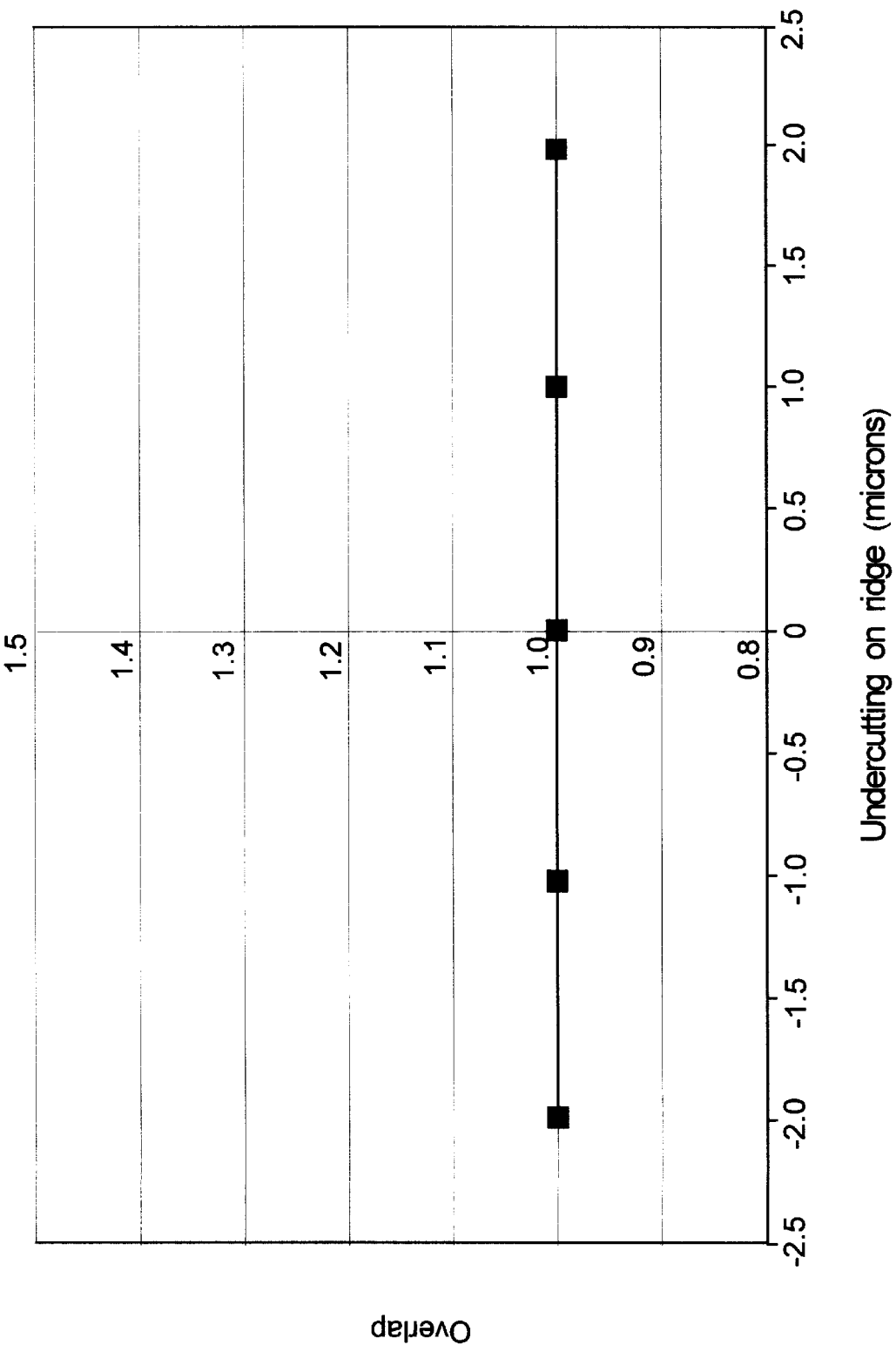
FIGS. 8–13 are plots of RF/optic overlap vs. amount of undercut of the re-entrant wall comparing the effect of ridge height and undercut on the effective RF/optic overlap.
Figure 9:
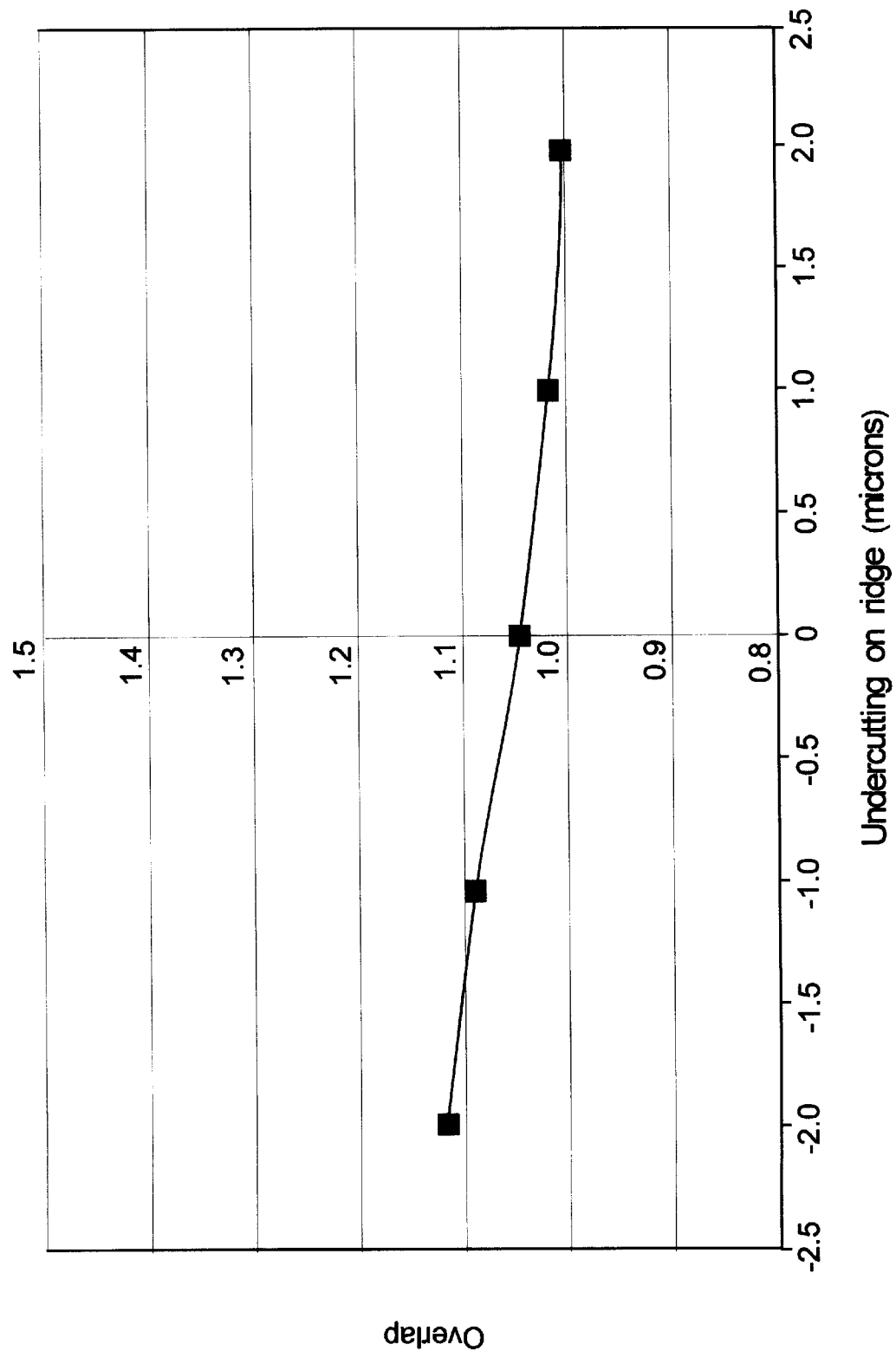

Computer modeling was performed for devices having the basic structure of FIG. 6 to determine the effect of different re-entrant sidewall geometries on RF/optical overlap. Results are given in FIGS. 8–13. FIG. 8 is a plot of effective overlap vs. extent of undercut for a device without a ridge, i.e. ridge height is zero and overlap is normalized at one. This curve is included as a baseline for FIGS. 9–13. The ridge width at the top of the ridge for the devices of FIGS. 8–13 is 10 $\mu$m, the thickness of the electrode is 15 $\mu$m, and the gap distance between electrodes is 15 $\mu$m. FIG. 9 gives data points for a device with a 1 micron ridge. An improvement in overlap of about 5% is obtainable for a ridge with a vertical sidewall. For sidewalls with positive slopes, the overlap deteriorates. Improvement in overlap results with any re-entrant undercut and is more than 10% for an undercut of 2 $\mu$m. It will be appreciated that the undercut in $\mu$m in FIGS. 8–13 are per side, i.e. the total undercut for the data point shown at $-2$ $\mu$m is 4 $\mu$m, meaning that the ridge has the shape of an inverted trapezoid, with a major base of 10 $\mu$m, and a minor base of 6 $\mu$m.

Figure 10:
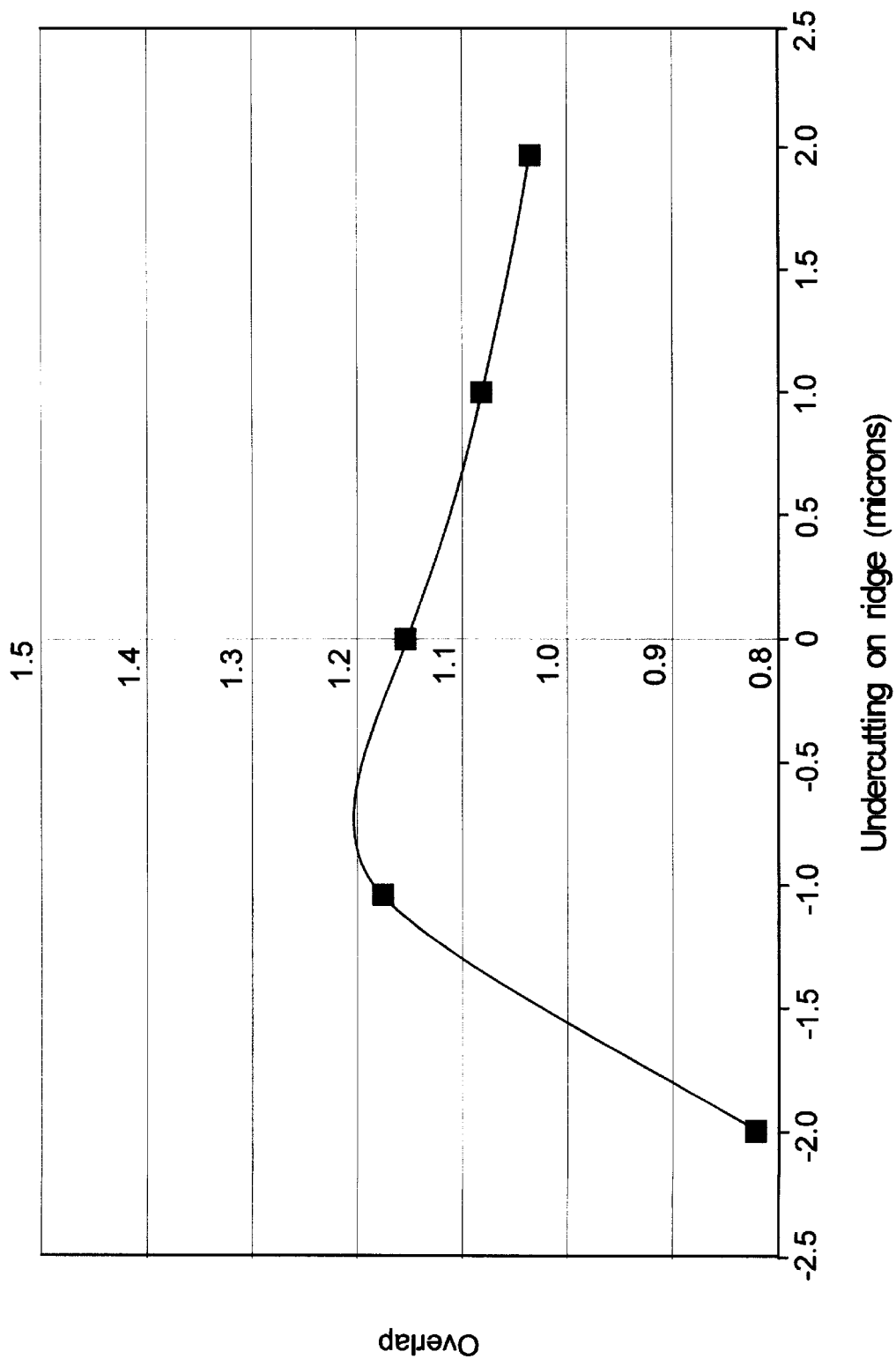
Figure 11:
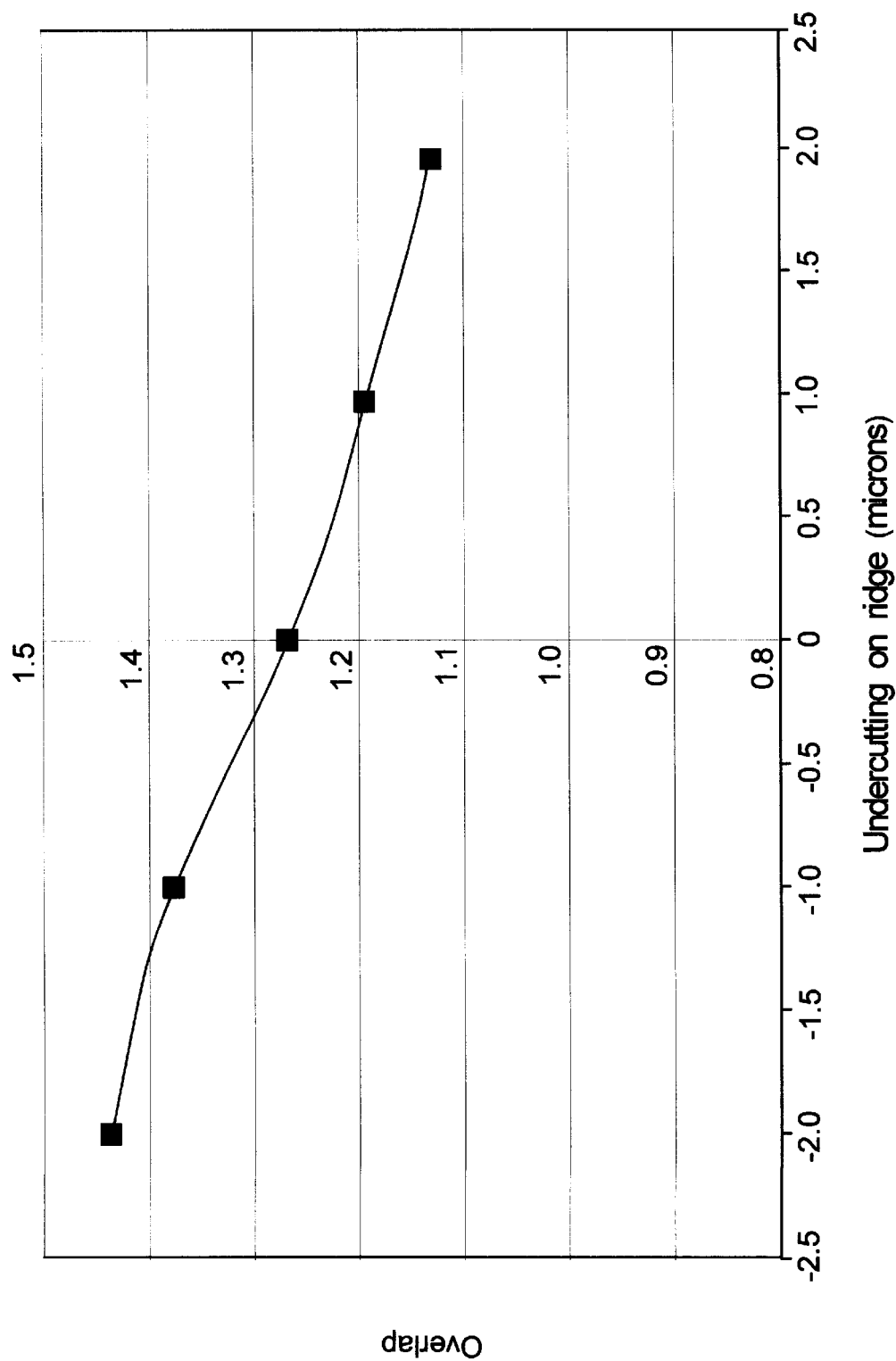

FIG. 10 gives data points for a 3 $\mu$m ridge height. Again moderate improvement is obtained with small undercuts but as the undercut increases the waveguide is perturbed and the effective overlap decreases. FIG. 11 shows data points for a 4 µm ridge height which, for the device geometry chosen for these models, gives optimum performance. As seen, a 44% improvement in overlap results with a 2 µm undercut. This compares with a device with a 4 µm ridge height with no undercut, i.e. 27%, resulting in an improvement of better than 60%.

Figure 12:
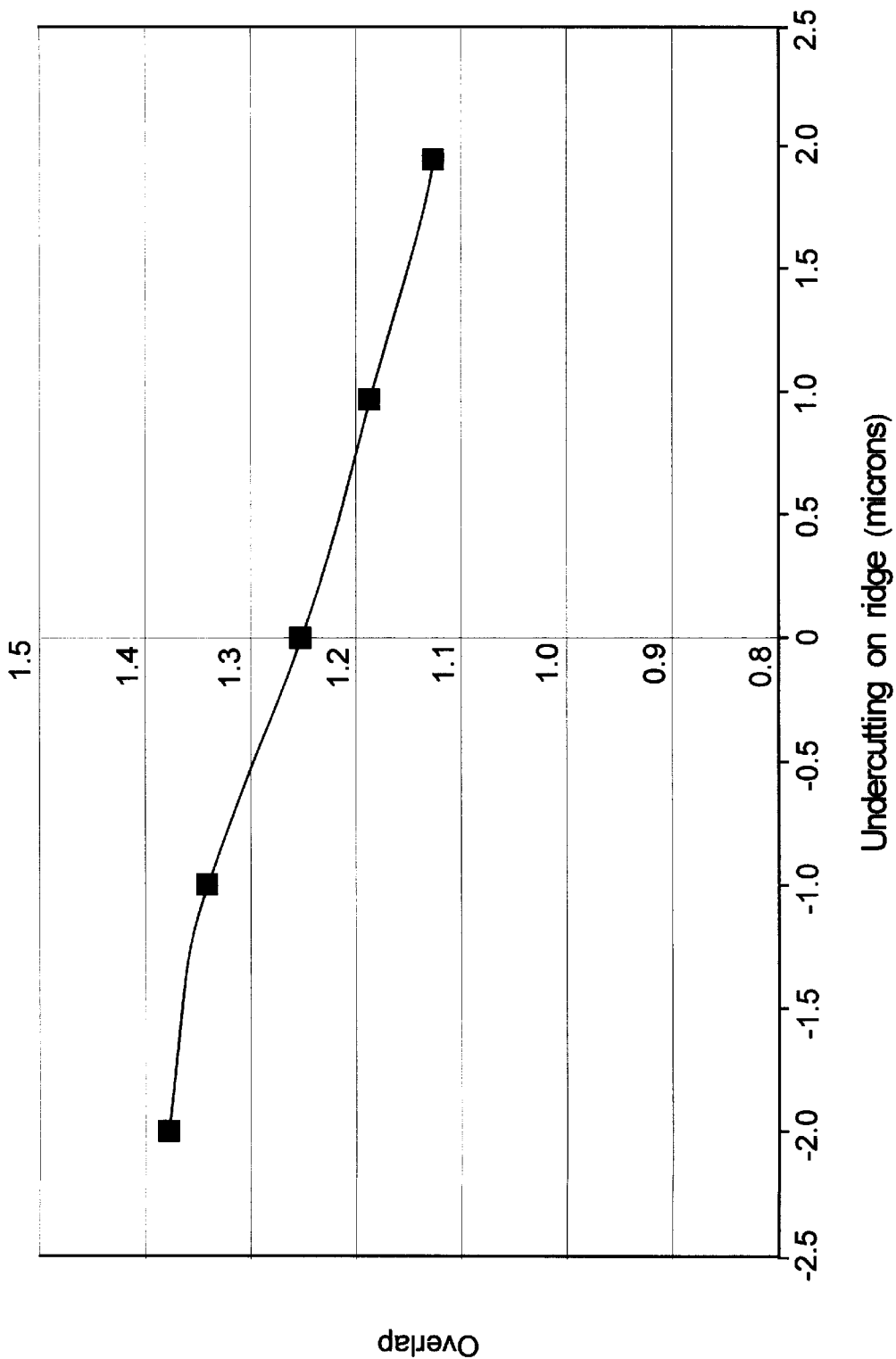
Figure 13:
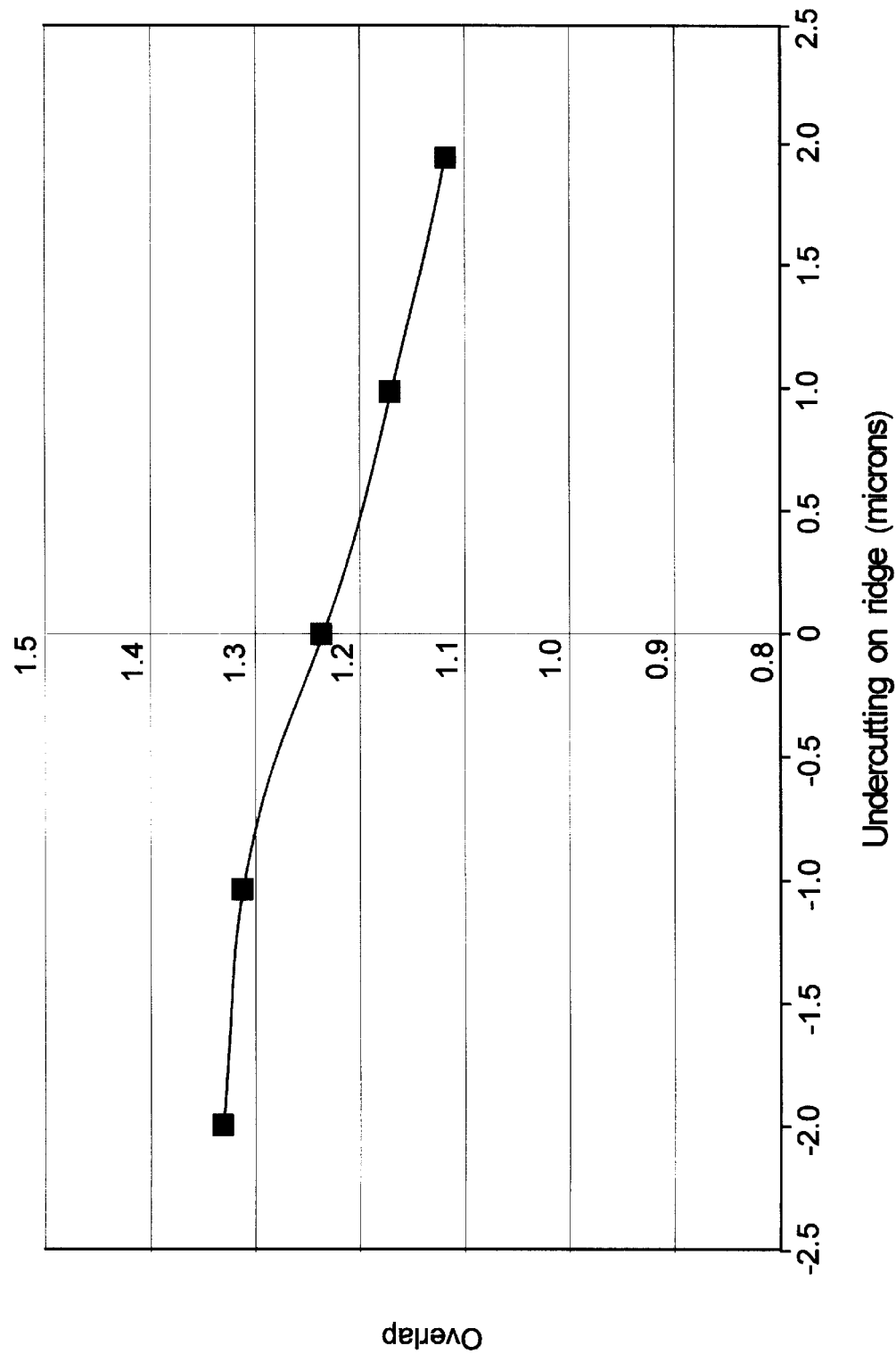

As evident from the data given in FIGS. 12 and 13, corresponding undercuts with deeper ridges actually produces diminishing returns in terms of overlap improvement. The device modeled in FIG. 12 has a ridge height of 5 µm, and the device modeled in FIG. 13 has a ridge height of 6 µm. However, improved overlap could be expected to occur in a variety of device geometries with ridge heights in the range 1–10 µm, and ridge widths in the range 3–20 µm. The range of suitable re-entrant angles is dependent on the starting geometry of the ridge and the size and location of the waveguide, but will typically be in the range −5° to −60°.

Recommended process steps for producing re-entrant sidewalls will be described in conjunction with FIGS. 14–24.

Figure 14:
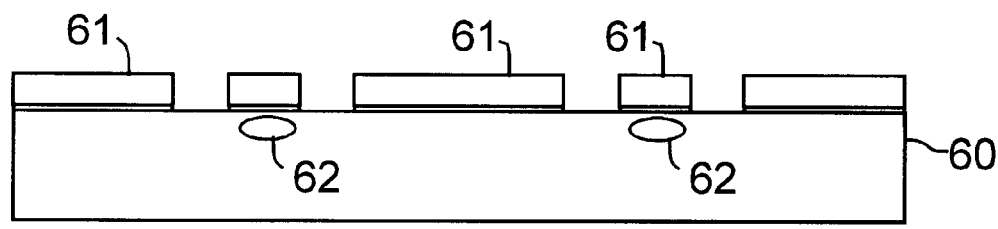
FIGS. 14–19 are schematic representations showing the steps in one embodiment of a process for the manufacture of the modified ridge modulator of the invention.
Figure 15:
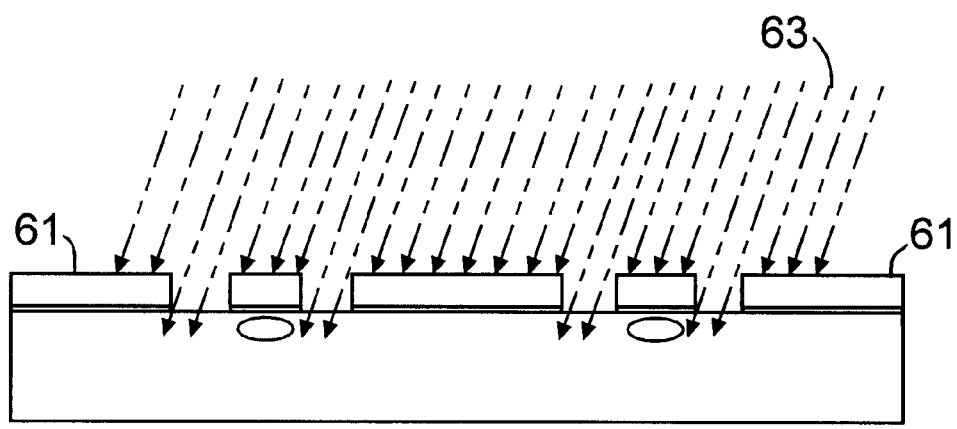
Figure 16:
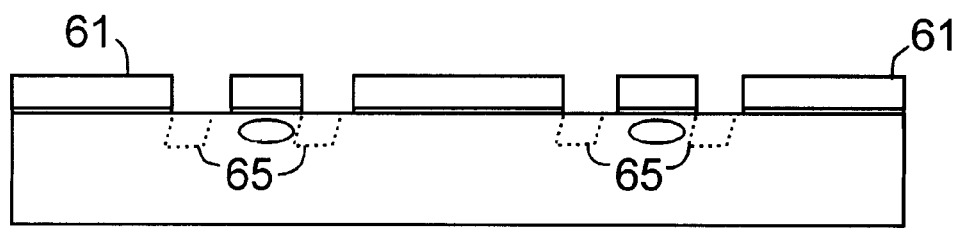
Figure 17:
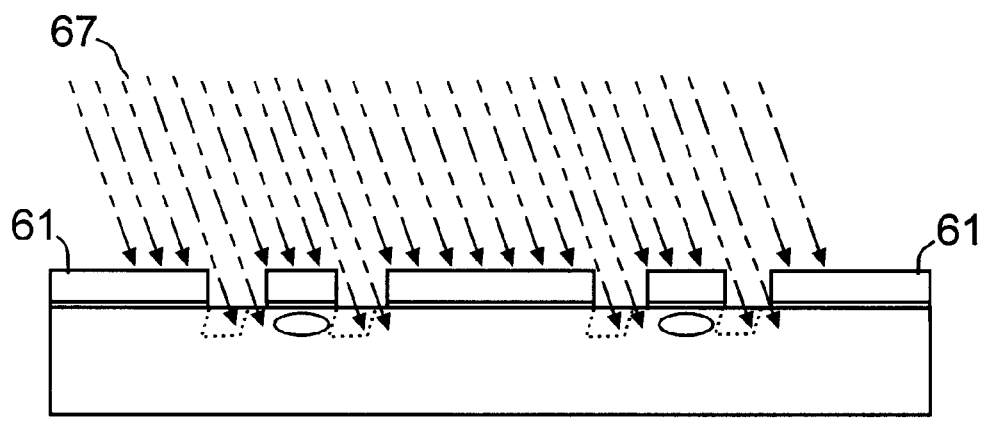
Figure 18:
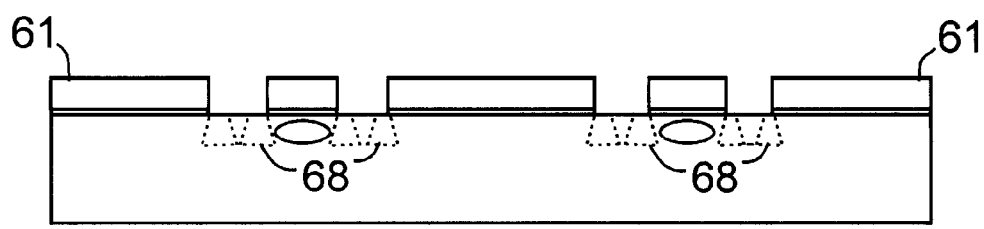
Figure 19:
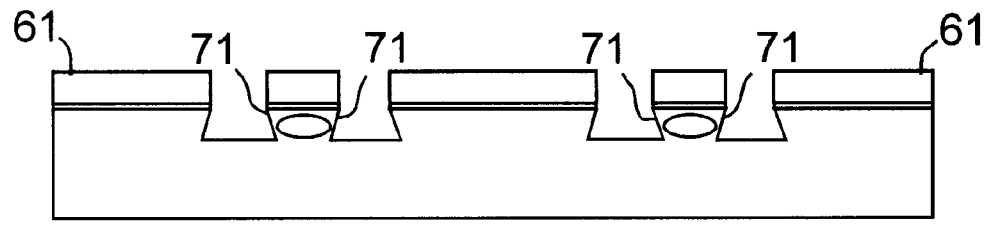

With reference to FIG. 14, a Mach-Zehnder device with lithium niobate substrate 60 is shown with electrodes 61 and waveguides 62. Using the electrode pattern as an implant mask, a first ion implant, represented by 63 in FIG. 15, is made at an angle with respect to the substrate as shown. The angle is approximately the desired re-entrant angle for the undercut structure of FIG. 6. The ion implant is used to selectively damage the lithium niobate crystal which then allows the damaged portions to be selectively etched with respect to the remainder of the substrate as is well known in the art. An implant of oxygen ions, with a dose of $5 \times 10^{14}/\text{cm}^3$ or greater is suitable. Other ions such a He or H can be used. The implant can be made through the oxide buffer layer, however removal of the buffer layer is preferred which reduces the required implant energy. The result of the implant step is the formation of damaged regions 65, as shown in FIG. 16. A similar implant is then performed but with the complementary angle as represented by implant 67 in FIG. 17. The result of this second implant is the formation of damaged regions 68 shown in FIG. 18. The damaged regions 65 and 68 combine to form a total damaged area with a trapezoid shape. The damaged regions are then selectively etched using a wet etch of, e.g., ammonium hydroxide, hydrogen peroxide, and water, commonly referred to as an RCA solution, or 5% HF in water, or a 2:1 mixture of concentrated $HNO_3$ and HF. The removal of the damaged region results in a ridge with the desired re-entrant sidewalls 71 as shown in FIG. 19. It will be recognized by those skilled in the art that the use of the electrode pattern as the implant mask results in a self-aligned structure and accurately places the re-entrant sidewalls with respect to the edge of the waveguides.

Figure 20:
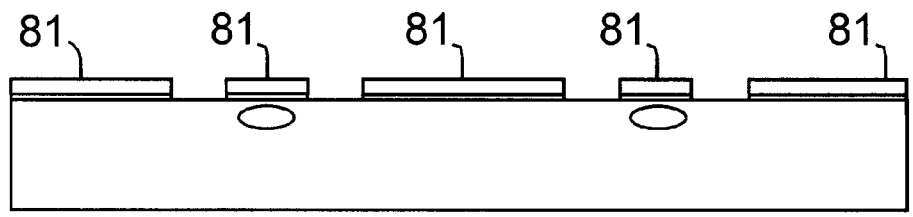
FIGS. 20–24 are schematic representations showing the steps in a second embodiment of a process for the manufacture of the modified ridge modulator of the invention.
Figure 21:
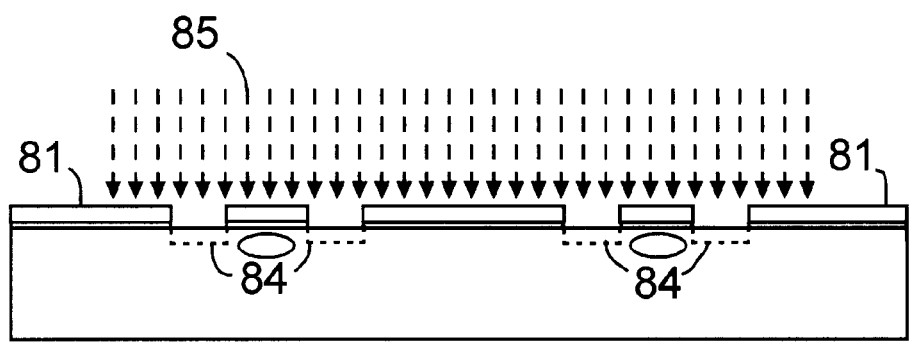
Figure 22:
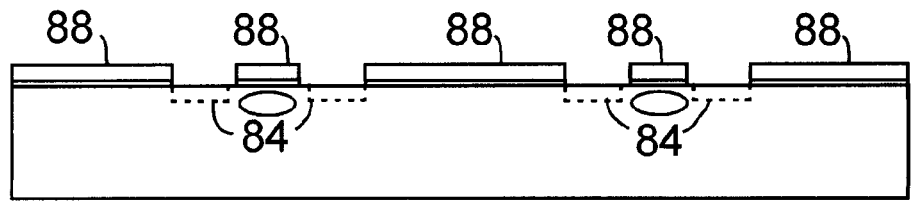
Figure 23:
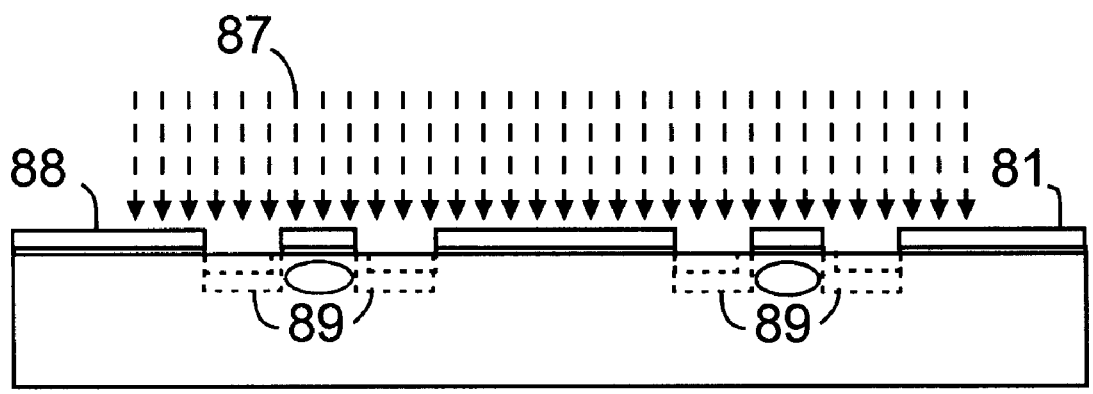
Figure 24:
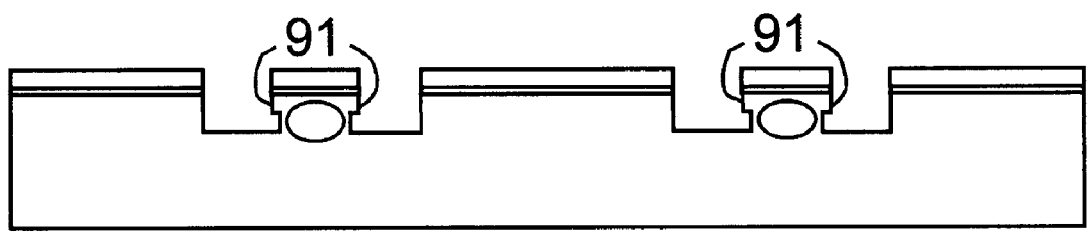

A photomask technique using multiple masks may also be used. An embodiment of this technique is shown in FIGS. 20–24. With reference to FIG. 20, a first mask 81 is applied to the substrate to mask the waveguide regions and define ridge regions. The mask material may be gold or tungsten, or other suitable material, that is patterned using standard lithographic techniques. Alternatively, a thick layer of photodefinable polymer, e.g. standard photoresist, can be used which simplifies the process somewhat. The width of the portion of the mask overlying the waveguides is made wider than the waveguide as shown in FIG. 20. A first implant step is then performed, as shown in FIG. 21, with the energy of implant beam 85 adjusted for a relatively shallow implant 84, e.g. to a depth less than the depth of the waveguide. The structure is then remasked, with mask 88. The portions of mask 88 that overlie the waveguide regions are narrower than the corresponding features in mask 81. A second implant with a higher implant energy, represented by 87, is then performed using mask 88 to define the implanted regions 89 as shown in FIG. 23. The energy of the ion implantation will depend on the geometry of the structure, etc. and energy/depth relationships are well known in the art. The depth of the second implant is preferably approximately equal to or greater than the depth of the waveguides. When the damaged regions are selectively etched away as shown in FIG. 24, re-entrant sidewalls 91 are formed. These re-entrant sidewalls are somewhat stepped, as mentioned earlier, but are effective since the electrode gap width at the bottom of the trench is larger than the width of the trench above the bottom. It will be appreciated by those skilled in the art that the sequence of implant steps just described can be reversed and the same results obtained. After completion of the re-entrant sidewalls, the device is finished by depositing the buffer layer and forming the electrodes. It may be desirable to fill the trenches to give a planar structure. Techniques for filling trenches are well known and used in various forms of trench isolation, and in trench capacitors for MOS devices.

Techniques for processing lithium niobate optical integrated circuits (OICs) in general are conventional and do not require specific exposition here in order to practice the invention. For example, methods for depositing and etching the $SiO_2$ barrier layer, methods for diffusing waveguides, techniques for depositing and lithographically patterning the electrode layer, etc., are not part of the invention described above but may be specified as general operations to give context for the steps of the invention.

Various additional modifications of this invention will occur to those skilled in the art. All deviations from the specific teachings of this specification that basically rely on the principles and their equivalents through which the art has been advanced are properly considered within the scope of the invention as described and claimed.

We claim:
1. Electro-optic modulator comprising:
   (a) an electro-optic substrate, said substrate having a main surface portion and a raised surface portion, said raised surface portion comprising a ridge of electro-optic material extending along at least a portion of said main surface, said ridge having a ridge surface and ridge sidewalls,
   (b) an optical waveguide formed in said substrate with at least a portion thereof formed in said ridge,
   (c) a first electrode formed on said ridge surface,
   (d) at least one second electrode formed on said main surface portion,
   (e) means for impressing a voltage between said first and second electrodes,
   the modulator wherein at least one of said sidewalls is re-entrant.
2. The electro-optic modulator of claim 1 wherein at least one of said sidewalls has a slope of at least −5°.
3. The electro-optic modulator of claim 1 wherein the said electro-optic material is lithium niobate.
4. The electro-optic modulator of claim 3 having electrodes on said main surface portion of said substrate and extending along both sidewalls of said ridge.
5. The electro-optic modulator of claim 4 wherein both of the sidewalls are re-entrant.

6. The electro-optic modulator of claim 5 wherein said ridge has a height in the range 1–10 μm.

7. The electro-optic modulator of claim 6 wherein said ridge has a width in the range 3–20 μm.

8. The electro-optic modulator of claim 1 wherein said waveguide splits into two Mach-Zehnder waveguide regions and recombines into a single waveguide.

9. The electro-optic modulator of claim 8 wherein each of said Mach-Zehnder waveguide regions has a ridge as defined in claim 1.

10. An electro-optic modulator comprising:
    (a) an electro-optic substrate,
    (b) a buried waveguide in said electro-optic substrate, said buried waveguide having two Mach-Zehnder portions essentially side by side, said Mach-Zehnder portions combining into a single input waveguide section and a single output waveguide section,
    (c) said Mach-Zehnder portions comprising:
        (i) a first trench extending along said substrate,
        (ii) a second trench extending along said substrate essentially parallel with said first trench and defining a ridge therebetween, said ridge having two ridge sidewalls and a ridge surface with at least one of said sidewalls being re-entrant, said ridge containing at least a portion of said waveguide, and
        (iii) an electrode on said ridge surface.

11. The electro-optic modulator of claim 10 wherein at least one of said sidewalls has a slope in the range $-5°$ to $-60°$.

12. The electro-optic modulator of claim 11 wherein the said electro-optic material is lithium niobate.

13. The electro-optic modulator of claim 12 having electrodes on the main surface portion of said substrate and extending along both sidewalls of said ridge.

14. The electro-optic modulator of claim 12 wherein both of the sidewalls are re-entrant.

15. The electro-optic modulator of claim 12 wherein said ridge has a height in the range 1–10 μm.

16. The electro-optic modulator of claim 15 wherein said ridge has a width in the range 3–20 μm.

17. A method for the manufacture of an electro-optic modulator comprising the steps of:
    (a) forming a buried waveguide in a substrate of electro-optic material,
    (b) depositing an electrode strip on said substrate overlying a portion of said buried waveguide, said portion defining a Mach-Zehnder electro-optic modulator region,
    (c) etching trenches in said substrate along each side of said buried waveguide in said Mach-Zehnder electro-optic modulator region to form a ridge of electro-optic material, with said waveguide at least partially contained in said ridge, said ridge of electro-optic material having at least one re-entrant sidewall.

18. The method of claim 17 wherein said etching step is preceded by an ion implant step wherein a portion of said substrate corresponding to said trench is damaged by the ion implant step and the damage is created in the shape of a trapezoid to thereby create the said re-entrant sidewall.

19. The method of claim 18 wherein said electrode is used as the implant mask during the ion implantation step.

20. The method of claim 19 wherein the ion implant step comprises directing the ion beam on said substrate at a first angle, said angle corresponding approximately to the angle of said re-entrant sidewall, to form a first damaged region in said substrate, directing the ion beam on said substrate at a second angle to form a second damaged region in said substrate, said second angle being approximately the complement of said first angle, and etching away the first and second damaged regions to form a ridge with re-entrant sidewalls.

* * * * *